United States Patent
Schweiger et al.

(10) Patent No.: US 7,533,837 B2
(45) Date of Patent: May 19, 2009

(54) COMMINUTING DEVICE (75) Inventors: Helmut Schweiger, St. Nikolai Im Sausal (AT); Alwin Pienz, Sonthofen (DE); Gert Muller, Moosbach (DE); Angelo Schmandra, Sonthofen (DE)

(73) Assignee: BHS-Sonthofen, GmbH, Sonthofen (DE)

( * ) Notice: Subject to any disclaimer, the term of this patent is extended or adjusted under 35 U.S.C. 154(b) by 621 days.

(21) Appl. No.: 10/526,148

(22) PCT Filed: Aug. 27, 2003

(86) PCT No.: PCT/DE03/09484

§ 371 (c)(1),
(2), (4) Date: Sep. 9, 2005

(87) PCT Pub. No.: WO2004/024331

PCT Pub. Date: Mar. 25, 2004

(65) Prior Publication Data

US 2006/0124787 A1    Jun. 15, 2006

(30) Foreign Application Priority Data

Aug. 29, 2002   (DE) .............................. 102 39 820

(51) Int. Cl.
*B02C 17/02* (2006.01)
*B02C 13/00* (2006.01)
*B07C 7/00* (2006.01)

(52) U.S. Cl. ..................... 241/74; 241/285.3
(58) Field of Classification Search ............. 241/74, 241/73, 285.3, 83, 86, 89.2
See application file for complete search history.

(56) References Cited

U.S. PATENT DOCUMENTS

| | | | |
|---|---|---|---|
| 1,212,419 A | | 1/1917 | Sturtevant |
| 2,082,419 A | * | 6/1937 | Rietz ............................ 241/49 |
| 3,891,152 A | | 6/1975 | Guggenheimer ........... 241/88.4 |
| 4,637,561 A | * | 1/1987 | Edberg ........................ 241/154 |
| 5,785,583 A | | 7/1998 | Becherer et al. |
| 5,944,268 A | | 8/1999 | Andela |

FOREIGN PATENT DOCUMENTS

EP    0 556 645 A1    8/1983

(Continued)

OTHER PUBLICATIONS

European Search Report.

(Continued)

*Primary Examiner*—Bena Miller
(74) *Attorney, Agent, or Firm*—Baker Botts L.L.P.

(57) ABSTRACT

A comminuting device includes a comminuting chamber which has a bottom wall and a circumferential wall which extends upwards from the bottom wall. The device also includes a rotatably driven drive shaft which extends essentially orthogonal to the bottom wall, and at least one comminuting element which is disposed next to the bottom wall. This at least one comminuting element can be made to perform a rotary movement about the drive shaft by the drive shaft. A plurality of additional comminuting elements which can be made to perform a rotary or revolving movement about the drive shaft (22) by means of the drive shaft are arranged above the at least one comminuting element comminuting element disposed next to the bottom wall.

26 Claims, 4 Drawing Sheets

FOREIGN PATENT DOCUMENTS

| | | |
|---|---|---|
| EP | 0 606 891 A1 | 1/1994 |
| EP | 0 778 086 A1 | 6/1997 |
| GB | 1572330 | 5/1978 |
| RU | 2072262 | 1/1997 |
| RU | 2179386 | 2/2002 |
| SU | 596283 | 3/1978 |
| SU | 980826 A | 12/1982 |
| SU | 1063457 | 12/1983 |
| SU | 1227242 | 4/1986 |

OTHER PUBLICATIONS

V.P. Barabashkin, "Hammer and Rotor Crushers," publisher "Nedra," Moskow: 1973, p. 63 (with partial English translation).

* cited by examiner

COMMINUTING DEVICE

CROSS REFERENCE TO RELATED APPLICATIONS

This application claims the benefit of International Patent Application No. PCT/DE2003/009484 filed Aug. 27, 2003, which claims priority to German Patent Application No. 102 39 820.8 filed Aug. 29, 2002, both of which applications are hereby incorporated by reference in their entireties herein.

FIELD OF THE INVENTION

The invention relates to devices for comminuting. In particular the invention relates to a device, which includes a comminution chamber having a bottom wall and a circumferential wall projecting upward from the bottom wall, and which is additionally provided with a rotational drive shaft extending essentially orthogonal to the bottom wall and with at least one comminution element arranged neighboring to the bottom wall and capable of being set in revolving motion about the drive shaft by the drive shaft

BACKGROUND OF THE INVENTION

Such comminuting devices are increasingly being employed in the recovery of raw materials. In particular, this may involve composite materials such as occur for example in the preparation for recycling of electric and electronic appliances or components, recycling monomaterials of ferrous metals, non-ferrous metals, synthetics or wood, fractions from other preceding coarse comminution processes in the recycling industry, or slags from processes of combustion.

A generic comminuting device is disclosed for example in EP 0,606,891 B1. This comminuting device includes a comminution chamber in which a rotor with vertical shaft is arranged. To this vertical shaft, immediately neighboring upon the bottom wall of the comminution chamber, two chains are attached as comminution elements. The comminution chamber is charged with material to be comminuted through an opening provided in the vicinity of its ceiling. When the material has been comminuted to the desired extent, a trap arranged in the circumferential wall of the comminution chamber near the bottom wall is opened to discharge the comminuted material. A disadvantage of this known comminuting device is that the material to be comminuted can only be comminuted batchwise, i.e. that the process of comminution is discontinuous.

Consideration is now being given to ways of improving comminuting devices and process. In particular, attention is directed to comminuting devices and processes that can be operated continuously.

SUMMARY OF THE INVENTION

A comminuting device which can be operated continuously is provided. The device includes a comminution element neighboring upon the bottom wall, and a plurality of additional comminution elements that are capable of being set in revolving motion about the drive shaft by said shaft. This configuration ensures that the material to be comminuted that is charged in the comminution chamber is multiply exposed to the impact of the blows of the comminution elements before it arrives at the bottom of the comminution chamber. Thus, the material to be comminuted cannot simply fall to the bottom and leave the comminution chamber again through the discharge opening under the very first blow of a comminution element, as is possible in the case of the comminuting device disclosed in EP 0,606,891 B1. Instead, a plurality of blows ensures an adequate comminution of the material to be comminuted before it arrives in the discharge area. Therefore, the material to be comminuted can be charged into the comminution chamber continuously.

Since the comminuting device according to the invention is preferably also employed for pre-comminution of the material to be comminuted, and the principal or final comminution of the material comminuted by it takes place in a comminuting device distributed by Applicant under the designation "Rotorprallmühle RPMV" [rotor impact mill RPMV]. it is tolerable if occasionally some not adequately comminuted object is discharged from the comminuting device according to the invention. Such an object, because of its size, can be separated in simple manner from the material discharged and returned to the comminuting device for renewed pre-comminution.

In order in simple manner to prevent the discharge of large objects, however, it is preferred that at least a portion of the circumferential wall be configured as a grating. This grating, which may be made up of a plurality of members preferably extending vertically, and arranged at a predetermined distance from each other, serves as a sieve, determining the size of material discharged from the comminuting device according to the invention. The material discharged from the comminuting device according to the invention is especially suitable as charging material for the "Rotorprallmühle RPMV" if the value of the predetermined distance is about 38 mm. In order to withstand the 'bombardment' with material to be comminuted, i.e. in order to diminish wear on the members of the grating, the members may be made of wear-resistant steel or of cast material.

So that a controlled discharge of the material that has passed through the grating may be assured, the grating may be surrounded by an outer jacket. To prevent wires or similar fine objects from getting stuck in the space between the grating and the outer jacket, it is proposed that the outer jacket have a predetermined minimum distance from the grating, amounting for example to about 200 mm. In the space between the grating and the outer jacket, the comminuted material may drop onto a catch means preferably of funnel-shaped configuration, for comminuted material, which is disposed at the bottom end of the outer jacket. From this catch means (e.g., a funnel-shaped hopper), the comminuted material may then be discharged downward, for example.

In addition to the circumferential wall, the bottom wall may also be configured as a grating, at least in part. The comminuted material passing through the bottom grating may also be discharged from the comminuting device by way of the funnel-shaped catch means.

In addition to the discharge by way of the funnel-shaped catch means, an opening openable and closable at will may be provided in the circumferential wall near the bottom wall, i.e. a discharge opening corresponding to the opening in EP 0,606,891 B1. As has already been explained above, this opening, if the comminuting device according to the invention includes neither a grating nor a catch hopper, may be the sole discharge opening of the comminuting device. Alternatively, however, it is possible also to use this opening as additional discharge opening. But in any case, this discharge opening may be used to empty the comminution chamber in event of overloading of the drive or blocking of the drive shaft. For opening and/or closing of the opening at will, a slide valve may be provided, dynamically actuable by means of a hydraulic cylinder. The size of the gap cleared by the slide valve may be used to influence the size of the material discharged or to influence the residence time in the comminution chamber of the material to be comminuted. Control of the size of this gap may be integrated into the over-all process of controlling the comminuting device.

To facilitate installation and maintenance work on the grating or/and the comminution elements, provision may be made for at least a circumferential segment of the outer jacket to be swingably arranged, preferably about an axis extending essentially vertical, or/and for at least a circumferential segment of the grating to be swingably arranged, preferably about an axis extending essentially vertical, or/and for a swingable circumferential segment of the grating and a swingable circumferential segment of the outer jacket to form a jointly manageable unit. This swingability may be provided by simple design and production techniques if the outer jacket has a polygonal, preferably an octagonal, contour. In the case of an octagonal contour, the comminuting device may for example be provided with a grating in the region of six of the eight sides of the comminuting device, whereas on the other two sides, preferably diametrically opposed to each other, functional parts may be provided, for example the charge opening for charging material to be comminuted and the discharge opening, making possible the complete emptying of the comminution chamber.

As is known per se from EP 0,606,891 B1, at least one comminution element, preferably the element neighboring to the bottom wall, may be made up of a chain. A comminution chain has the advantage that, when necessary, it can escape upward, diminishing wear on the bottom wall.

Moreover, however, it is also possible that at least one comminution element may be made up of an impact member. Impact members, compared to impact chains, have the advantage that they strike the material to be comminuted with greater momentum, and therefore comminute it more effectively. In order to make possible an escape of the impact members when necessary and thus keep them from breaking off, provision may also be made for the impact member to be articulately attached to the drive shaft, preferably swingably about an axis extending preferably parallel to the drive shaft.

If the comminution elements are helically arranged on the drive shaft, and this preferably in such manner that a comminution element closer to the bottom wall is arranged to run ahead of a comminution element more distant from the bottom wall in the direction of revolution about the drive shaft, then the comminution elements working together on the material to be comminuted can exert a force opposed to gravity. This leads to a prolonged residence of the material to be comminuted in the comminution chamber, and therefore to its better comminution. For this purpose, the drive shaft may, for example, be configured as a hexagonal shaft.

In development of the invention, it is proposed that the comminution elements be arranged on the drive shaft in planes of comminution elements, having a predetermined minimum distance between them, which may, for example, be about 120 mm. Here, the predetermined minimum distance ensures, firstly, that the suspension of the comminution elements on the drive shaft is of sufficiently stable construction, and secondly that even fairly large fragments of the material to be comminuted can move gradually between the comminution elements towards the bottom wall. In this way, it is ensured that all comminution elements can contribute to the comminution and therefore will wear down uniformly.

If between the free end of at least one of the comminution elements and the circumferential wall a predetermined distance is provided, then this can reduce the risk of a jamming or wedging of the material to be comminuted between the comminution elements and the circumferential wall, with favorable effects on wear of the circumferential wall, especially when this is configured as a grating.

If at least one annular attachment is provided, projecting inward from the circumferential wall and preferably of funnel-shaped configuration, then the material that falls downward in the existing gap between the free end of the comminution elements and the circumferential wall can be returned to within reach of the comminution elements. Besides, the annular attachment may be employed as protection for the fastening elements, preferably threaded bolts, with which the elements of the grating are fastened to a bent flattened steel member serving as suspension means.

In manner known per se, a charge opening may be provided in the region of the upper edge of the circumferential wall, for charging material to be comminuted. Such a charge opening may extend from the upper edge of the circumferential wall over a predetermined distance towards the bottom wall.

In this way, the material to be comminuted may be introduced at least in part laterally into the comminution chamber, reducing the free height to be provided in the region of the comminuting device according to the invention in view of the structural height of the comminuting device itself and the size of the material to be comminuted. As already suggested above, the charge opening is preferably provided in a circumferential region of the comminuting device not configured with a grating.

In order to be able to prevent the material to be comminuted from being knocked out of the comminution chamber through the charge opening again upon first contact with a comminution element, only one comminution element may be provided in the uppermost plane of comminution elements, and also if desired in at least one additional comminution element plane arranged below. In addition or alternatively, at least the at least one uppermost comminution element may be of shorter configuration than the remaining comminution elements. Finally, a recoil of charged material may also be prevented in that a supply passage preceding the charge opening is of angled configuration.

In order to be able to secure a stable rotation of the drive shaft despite the plurality of comminution elements, it is proposed that the drive shaft be rotatably mounted both on the bottom wall and on a ceiling wall of the comminution chamber.

In manner known per se, the drive motor may be connected to the drive shaft by a belt drive. Here, this belt drive may equalize speed fluctuation of the drive shaft due to the impact loading in simple manner, so that these speed fluctuations will not load the drive motor. The speed of the drive shaft may be between about 200 rpm and about 2,000 rpm, preferably between about 500 rpm and about 1,000 rpm.

Finally, a connection opening may be provided for connection of an exhaust device, preferably in a circumferential region without grating. This connection opening may also be arranged behind an impact wall, so that wires and the like particles whose mass exceeds a predetermined value will not be aspirated, owing to their inertia.

BRIEF DESCRIPTION OF THE DRAWING

Further features of the invention, its nature, and various advantages will be more apparent from the following detailed description and the accompanying drawings, wherein like reference characters represent like elements throughout, and in which.

DETAILED DESCRIPTION OF THE INVENTION

The present invention provides comminuting devices and comminuting processes. Features of an exemplary device and process are described herein with reference to FIGS. 1-4.

Figure 1:
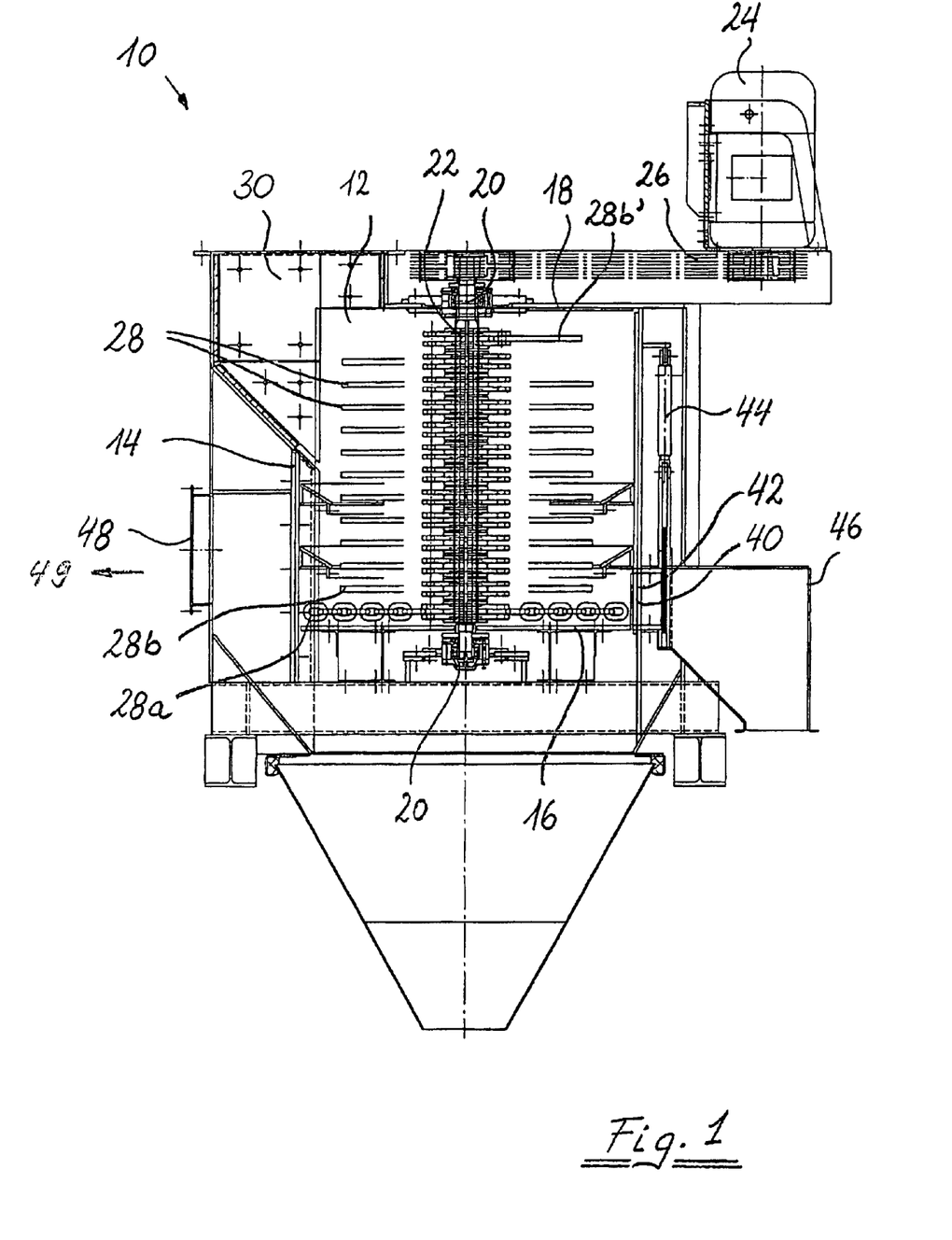
FIG. 1 represents a sectional view of a comminuting device according to the invention, at the line I-I in FIG. 3.
Figure 2:
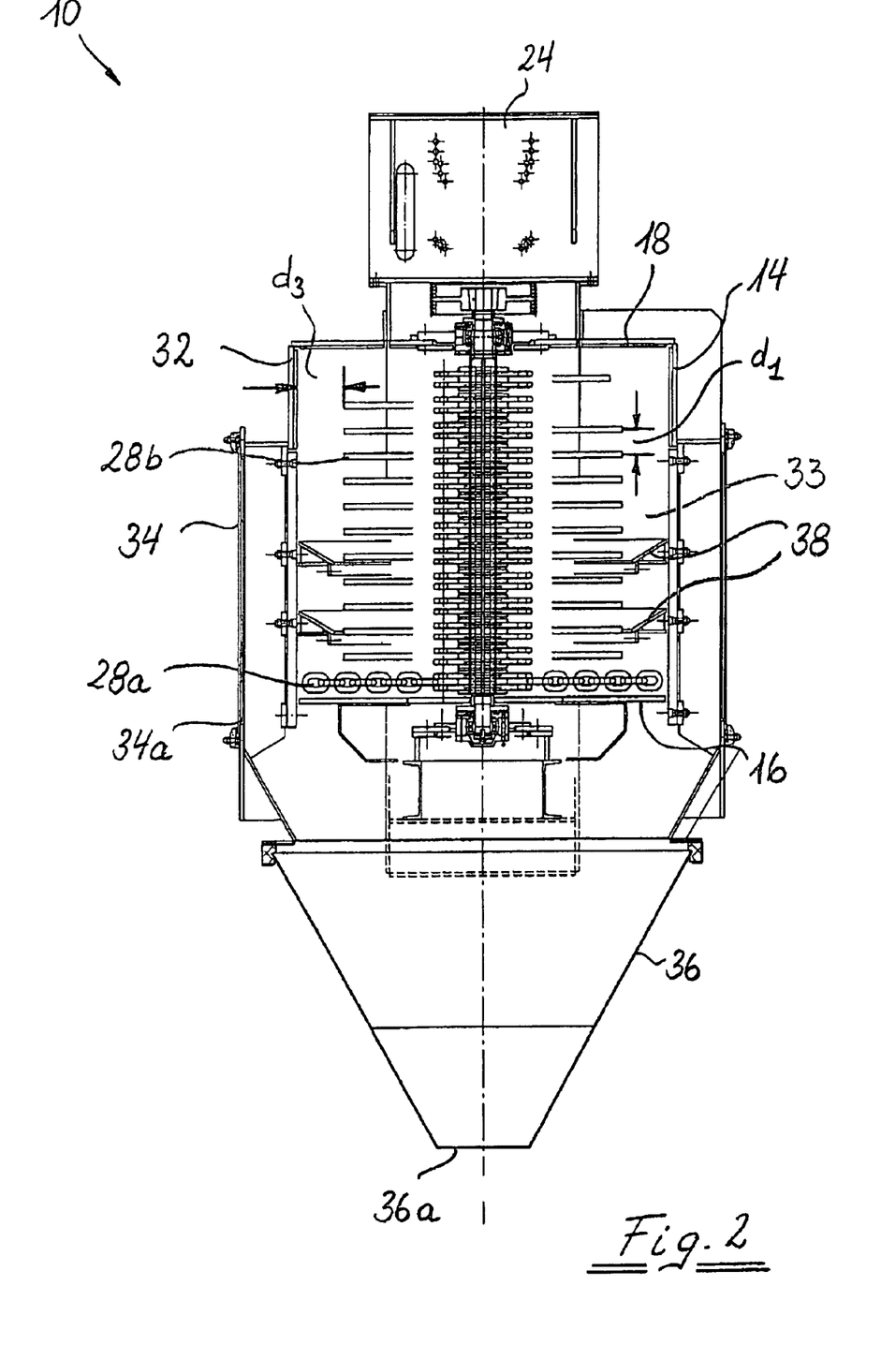
FIG. 2 represents a sectional view of a comminuting device according to the invention, at the line II-II in FIG. 3.

FIG. 1 shows a comminuting device according to the invention, which is quite generally designated device 10. It includes a comminution chamber 12 bounded by a circumferential wall 14, a bottom wall 16 and a ceiling wall 18. In the neighborhood of the bottom wall 16 and the ceiling wall 18, bearing locations 20 are provided for a drive shaft 22, driven by a drive motor 24 by way of a belt drive 26 in the direction of the arrow P (see FIG. 3).

On the therefore essentially vertical drive shaft 22, a plurality of comminution elements 28 are arranged in pairs in comminution element planes one above another. Only the two uppermost planes, i.e. comminution element planes next to the ceiling wall 18, comprise only a single comminution element 28. The comminution elements of the plane next to the bottom wall 18 are configured as impact chains 28a, while the remaining comminution elements are configured as impact members 28b. The impact members 28b are suspended in flying/cantilever arrangement on the drive shaft 22, i.e. swingable about an axis extending essentially parallel to the drive shaft 22. For the sake of clarity of the representation in FIG. 1, this is shown only for the impact member 28b' of the uppermost plane of comminution elements. The comminution element planes have a distance $d_1$ from each other (see FIG. 2).

In the representation according to FIG. 1 at the upper left, the comminution chamber 12 has an entrance 30 for the material to be comminuted. So that this material will not recoil into the entrance 30 immediately upon first contact with the impact members 28b, each of the uppermost two planes of comminution elements is provided with only one impact member 28b. In how many planes of comminution elements only one impact member 28b is provided depends on how far the entrance 30 extends downward along the height of the circumferential wall 14. Besides, the impact members 28b of the uppermost planes of comminution elements are configured shorter than the remaining impact members. This is indicated in FIG. 1 only for the uppermost impact member 28b'. In principle, however, the impact members 28b of several planes of comminution elements may be curtailed, and this preferably with a 'pine-tree-like' lengthwise staggering. How many comminution element planes are involved in the curtailment of the impact members depends among other things on how far the entrance 30 extends along the radius of the comminution chamber 12 towards the drive shaft 22.

By contact with the rotating impact members 28b, the material charged through the entrance opening 30 into the comminution chamber 12 is comminuted. Larger pieces here reside in the neighborhood of the entrance 30 until they are broken by the uppermost impact members 28b into fragments whose size depends among other things on the distance d, between the comminution element planes, the circumferential offset of the impact members of neighboring comminution element planes and the speed of the drive shaft 22. Then these fragments move downward by gravity through the various comminution element planes, being further comminuted through the impact effect of the impact members 28b and/or the impact chains 28e.

Figure 3:
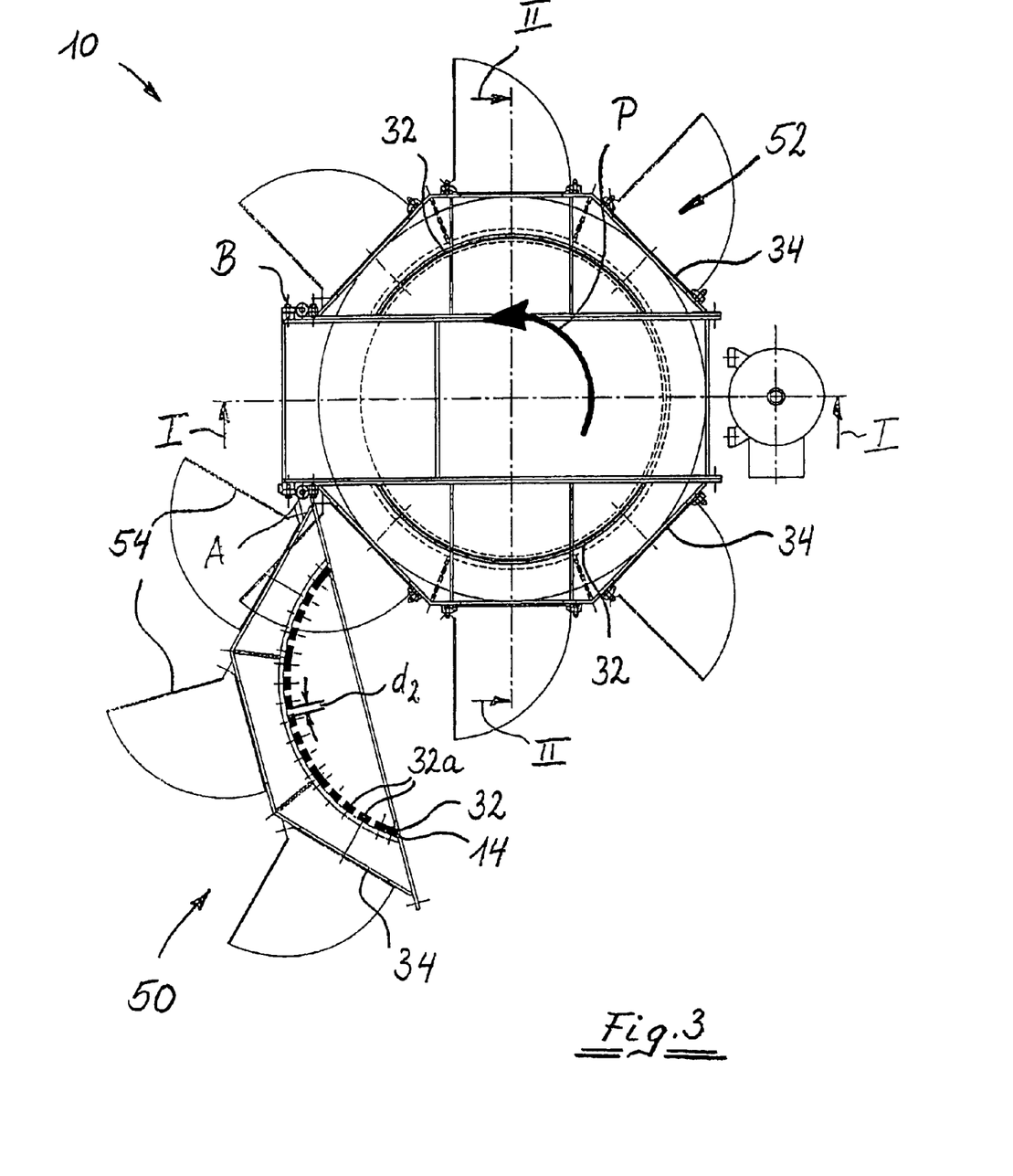
FIG. 3 represents a top view of a comminuting device according to the invention; and, FIG. 4 shows a graph to illustrate the service possibilities of the comminuting device according to the invention.

Especially small fragments are flung radially outward against the circumferential wall 14 by the impact of the members 28b. This circumferential wall 14, as shown in FIG. 3, consists of a grating 32 composed of a plurality of grating members 32a arranged vertically. The grating members 32a have a mutual distance $d_2$ so that fragments whose dimensions are smaller than the quantity $d_2$ pass through the gratings 32 and can leave the comminution chamber 12. In order to ensure an orderly discharge of this comminuted material, the circumferential wall 14 and/or the grating 32 are surrounded by an outer jacket 34 opening at its bottom end 34a into a catch hopper 36. The lower opening 36a of the hopper 36 guides the comminuted material out of the comminuting device 10.

To prevent excessive stress and hence excessive wear on the grating members 32a by the fragments of material to be comminuted, a distance $d_3$ is provided between the free ends of the impact members 28b and the circumferential wall 14 and/or the gratings 32. Owing to this distance $d_3$, which is greater than the distance $d_2$ of the members 32a, however, there is the danger that material not yet sufficiently comminuted may bounce off the grating 32 and drop between the grating 32 and the free ends of the impact members 28b onto the bottom plate 16. This would lead to an excessive stress on the impact chains 28a and the lowermost impact members 28b. Therefore, in this intervening space 33, two funnel-shaped annular attachments 38 are provided, which return material falling down into this space to the region of the impact members 28b. In this way, a uniform wear of all comminution elements 28 can be ensured.

If, owing to wrong choice of operating parameters, for example a too rapid supply of the material to be comminuted, too slow a speed of the drive shaft 22, or the like, some excessive collection of not adequately comminuted material should nevertheless occur in the region of the bottom wall 16, then this undesired accumulation of material can be thrown out of the comminution chamber 12 through a lateral opening 40. This lateral opening 40 is closable by means of a trap 42, openable or closable at will by means of a hydraulic cylinder 44. A protective casing 46 provides for an orderly ejection of material without risk of danger to operating personnel.

Finally, FIG. 1 also shows a connection 48 for an exhaust device 49, aspirating dust and the like from the comminution chamber 12 and from the annular space 33 between grating 32 and outer jacket 34.

As shown in FIG. 3, the comminuting device 10 according to the invention, i.e. in particular its outer jacket 34, comprises an octagonal cross-section. Here the three lower side surfaces of the outer jacket 34 in FIG. 3 and the circumferential segment of the grating 32 associated with them are combined into a unit 50, which can be swung away from the rest of the comminuting device 10 about a vertical axis A to afford access to the comminution chamber 12 and in particular to the drive shaft 20 and to the comminution members 28 for maintenance or operating personnel. Furthermore, each of the three side surfaces of the outer jacket 34 comprises a maintenance flap 54, affording access to the outside of the grating 32 after being swung away from the outer jacket 34, for example, in order to replace individual grating members 32a. Similarly, the three upper side surfaces of the outer jacket 34 are combined into a corresponding unit 52 capable of being swung away from the remaining comminuting device 10 about the axis B.

In the circumferential segments corresponding to the remaining two side surfaces of the outer jacket 34, the drive motor 24 including the belt drive 26, the ejection opening 40, the entrance 30 and the connecting nozzle 48 for the exhaust device 49 are arranged. In these two circumferential segments, the circumferential wall 14 is configured continuously, i.e. without grating.

Figure 4:
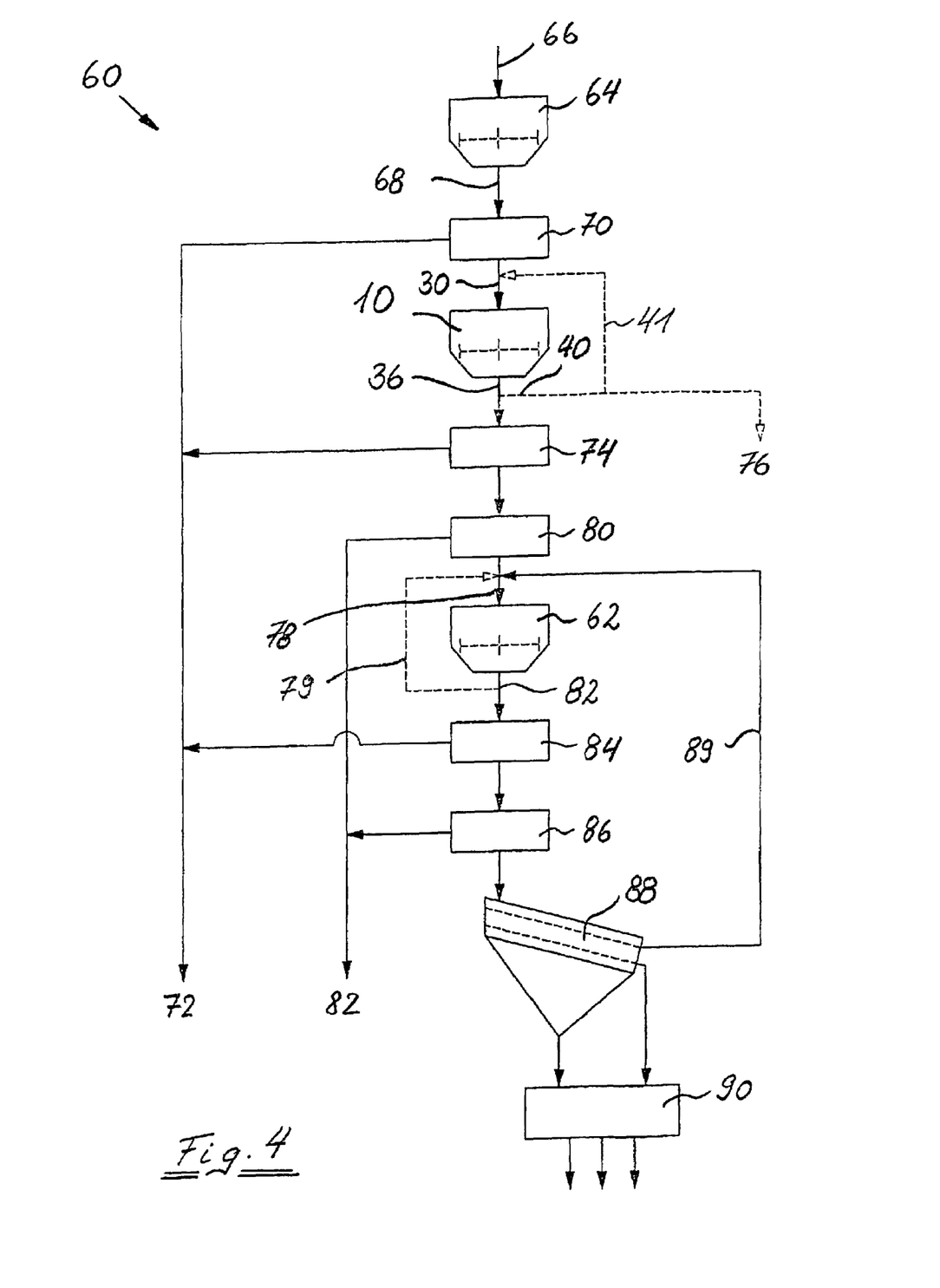

In FIG. 4, the conception of a comminution plant 60 is represented in the form of a process diagram, to be employed for recovery of raw materials including compound material, from equipment, such as refrigerators, washing machines, television sets, computers, motor vehicle parts or the like.

In this plant 60, the comminuting device 10 according to the invention serves for pre-comminution of the material to be comminuted. The final comminution takes place in another comminuting device 62, for example the comminuting device distributed by Applicant under the designation 'Rotorprallmühle RPMV.' Depending on the material to be comminuted in each instance, it may be necessary or advantageous to precede the comminuting device 10 according to the invention with an additional comminuting device 64 for coarse comminution, for example the comminuting device disclosed in EP 0,606,891 B1.

On Detailed Course of Process

The material to be comminuted is introduced at 66 into the comminuting device 64 for coarse comminution. The coarsely comminuted material discharged therefrom at 68 is supplied to a screener 70, which separates light material and discharges it at 72. The remaining material is supplied to the entrance 30 of the comminuting device 10 according to the invention for pre-comminution. The pre-comminuted material discharged by way of the catch hopper 36 is passed on to another screener 74, which again separates out light material.

To prevent clogging and hence blocking of the comminuting device 10, material not adequately comminuted is ejected through the lateral opening 40 and returned to the entrance 30 by way of the conveyor 41. If necessary, un-comminuted material may be separated out completely and discharged at 76.

Before the material provided by the screener 74 for principal comminution is supplied to the comminuting device 62 at 78 for final comminution, ferromagnetic parts are separated out in a magnetic separator 80 and discharged at 82.

The comminuting device 62 may also be operated in partial circulation, i.e. material not sufficiently comminuted may be returned by way of a conveyor 79 to the entrance 78 of the comminution device 62. Following the principal or final comminution, a further screening takes place in a screener 84 and a further separation of ferromagnetic particles in a magnetic separator 86, before the remaining finally comminuted material is supplied to a classifying device 88 and a sorting device 90. If, owing to inadequate physical separation various materials render impossible a classification of certain fractions of the comminuted material, then this unclassifiable fraction may be returned by way of a conveyor 89 to the entrance 78 of the comminuting device 62

It will be understood that the foregoing is only illustrative of the principles of the invention, and that various modifications can be made by those skilled in the art without departing from the scope and spirit of the invention.

The invention claimed is:

1. A comminuting device, comprising:
   a comminution chamber having a bottom wall and a circumferential wall projecting upward from the bottom wall,
   a rotationally drivable drive shaft extending essentially orthogonal to the bottom wall and at least one comminution element arranged adjacent to the bottom wall and capable of being set in revolving motion about the drive shaft by said shaft, and
   a plurality of additional comminution elements capable of being set in revolving motion about the drive shaft by said shaft, which are disposed above the comminution element adjacent to the bottom wall,
   wherein at least a portion of the circumferential wall of the comminution chamber is configured as a grating and wherein the grating is surrounded by an outer jacket, at the lower end of which a catch device is provided for comminuted material, and
   characterized in that, in the circumferential wall of the comminution chamber an opening adjacent to the bottom wall and openable and closable at will is provided, which can be used as an additional discharge opening.

2. The comminuting device of claim 1, characterized in that the grating is composed of a plurality of members that extend about vertically, and are arranged at about a predetermined distance $d_2$ from each other.

3. The comminuting device of claim 1, characterized in that the outer jacket has a predetermined minimum distance from the grating.

4. The comminuting device of claim 1, characterized in that at least one circumferential segment of the outer jacket is swingably configured about an axis that extends essentially vertically.

5. The comminuting device of claim 1, characterized in that at least one circumferential segment of the grating is swingably configured about an axis that extends essentially vertically.

6. The comminuting device of claim 1, characterized in that a swingable circumferential segment of the grating and a swingable circumferential segment of the outer jacket form a jointly manageable unit.

7. The comminuting device of claim 1, characterized in that the outer jacket comprises a polygonal contour shape.

8. The comminuting device of claim 1, characterized in that at least a portion of the bottom wall is configured as a grating.

9. The comminuting device of claim 1, characterized in that at least one comminution element, comprises a chain.

10. The comminuting device of claim 1, characterized in that at least one comminution element comprises an impact member.

11. The comminuting device of claim 10, characterized in that the impact member is articulated to the drive shaft, and is swingable about an axis that extends about parallel to the drive shaft.

12. The comminuting device of claim 1, characterized in that the comminution elements are arranged helically on the drive shaft so that a comminution element nearer to the bottom wall is arranged to run ahead more than a comminution element more distant from the bottom wall in the direction of revolution about the drive shaft.

13. The comminuting device of claim 1, characterized in that the drive shaft is a hexagonal shaft.

14. The comminuting device of claim 1, characterized in that the comminution elements are arranged on the drive shaft in planes of comminution elements, wherein the planes have about a predetermined minimum distance $d_1$ from each other.

15. The comminuting device of claim 1, characterized in that, between the free end of at least one of the comminution elements and the circumferential wall, a predetermined distance $d_3$ is provided.

16. The comminuting device of claim 1, characterized in that at least one annular attachment projecting inward from the circumferential wall is provided, wherein the annular attachment has a funnel-shaped configuration.

17. The comminuting device of claim 1, characterized in that in the neighborhood of the upper edge of the circumferential wall, a charge opening is provided for supply of material to be comminuted.

18. The comminuting device of claim 17, characterized in that the charge opening extends from the upper edge of the circumferential wall over a predetermined distance towards the bottom wall.

19. The comminuting device of claim 1, characterized in that, at least one plane of the uppermost plane of comminution elements and the planes of comminution elements arranged thereunder, consists a single comminution element.

20. The comminuting device of claim 1, characterized in that at least one uppermost comminution element is configured to be shorter than the other comminution elements.

21. The comminuting device of claim 1, characterized in that a supply passage preceding the supply opening has an angled configuration.

22. The comminuting device of claim 1, characterized in that the drive shaft is rotatably mounted both at the bottom wall and also at a ceiling wall of the comminution chamber.

23. The comminuting device of claim 1, characterized in that a drive motor is connected to the drive shaft by way of a belt drive.

24. The comminuting device of claim 1, characterized in that a speed of the drive shaft is between about 200 rpm and about 2,000 rpm, and an optimal speed of the drive shaft is about 500 rpm and about 1,000 rpm.

25. The comminuting device of claim 1, further comprising a connection opening for an exhaust device.

26. The comminuting device of claim 1, wherein the catch device is of funnel shaped configuration.

* * * * *